(12) United States Patent
Ducharme (10) Patent No.: US 8,745,511 B2
(45) Date of Patent: *Jun. 3, 2014

(54) SYSTEM AND METHOD FOR CUSTOMIZING LAYER BASED THEMES

(75) Inventor: Dale Ducharme, Toronto (CA)

(73) Assignee: BlackBerry Limited, Waterloo (CA)

( * ) Notice: Subject to any disclaimer, the term of this patent is extended or adjusted under 35 U.S.C. 154(b) by 877 days.

This patent is subject to a terminal disclaimer.

(21) Appl. No.: 12/859,073

(22) Filed: Aug. 18, 2010

(65) Prior Publication Data

US 2011/0010647 A1 Jan. 13, 2011

Related U.S. Application Data

(63) Continuation of application No. 12/410,193, filed on Mar. 24, 2009, now Pat. No. 7,802,192, which is a continuation of application No. 11/551,773, filed on Oct. 23, 2006, now Pat. No. 7,536,645.

(51) Int. Cl.
*G06F 3/048* (2013.01)
*G06F 3/00* (2006.01)

(52) U.S. Cl.
USPC .......................................... 715/763; 715/744

(58) Field of Classification Search
None
See application file for complete search history.

(56) References Cited

U.S. PATENT DOCUMENTS

| | | | |
|---|---|---|---|
| 6,104,391 A * | 8/2000 | Johnston et al. | 715/745 |
| 6,873,337 B1 * | 3/2005 | Fernandez et al. | 345/581 |
| 2001/0048408 A1 | 12/2001 | Koyama et al. | |
| 2002/0073104 A1 | 6/2002 | Nunez | |
| 2006/0026527 A1 * | 2/2006 | Bells | 715/747 |
| 2006/0059430 A1 * | 3/2006 | Bells et al. | 715/747 |
| 2011/0010647 A1 * | 1/2011 | Ducharme | 715/763 |

OTHER PUBLICATIONS

Plazmic Content Developer's Kit™ for BlackBerry (Theme Builder Section), website address: http://www.blackberry.com/developers/resources/demos/plazmic/731_RIM_PlazmicContent.htm, printed Jul. 12, 2006.
Office Action issued by the Canadian Intellectual Property Office dated Feb. 13, 2009 for corresponding Canadian Patent Application No. 2,565,378.

* cited by examiner

*Primary Examiner* — Matt Kim
*Assistant Examiner* — Maryam Ipakchi
(74) *Attorney, Agent, or Firm* — Gowling Lafleur Henderson LLP (57) ABSTRACT

There is provided a method for customizing a customizable theme of a user interface of a communication device. The user interface includes a plurality of screens having one or more modifiable screen attributes. The method further includes: receiving a base theme comprising a plurality of layers, each of the layers comprising at least one graphical object, the graphical object having one or more graphical properties; mapping each one of a plurality of screens of the user interface to a respective one of the plurality of layers, each of the mapped screens having at least one screen attribute associated therewith; mapping each respective at least one screen attribute to the graphical properties of the at least graphical object of the respective one of the layers, the mapped screens and the least one screen attribute defining the customizable theme of the user interface; receiving an attribute modification request for modifying the at least one screen attribute corresponding to a first screen of the plurality of screens to customize the customizable theme; determining the mapping of the at least one screen attribute to the graphical properties of the at least one graphical object of the respective one of the plurality of layers; and modifying the graphical properties of the at least one graphical object according to the attribute modification request and the mapping of the at least one screen attribute.

19 Claims, 8 Drawing Sheets

SYSTEM AND METHOD FOR CUSTOMIZING LAYER BASED THEMES

CROSS REFERENCE TO RELATED APPLICATIONS

This application is a continuation of earlier filed nonprovisional application having application Ser. No. 12/410,193 filed Mar. 24, 2009, now U.S. Pat. No. 7,802,192, granted Sep. 21, 2010, which in turn is a continuation of application Ser. No. 11/551,773 filed Oct. 23, 2006, now U.S. Pat. No. 7,536,645, granted May 19, 2009. This application claims priority under 35 U.S.C. 120 to both of said application Ser. No. 12/410,193 and said application Ser. No. 11/551,773. The disclosures of both of said application Ser. No. 12/410,193 and said application Ser. No. 11/551,773 are hereby incorporated by reference in the entirety.

FIELD

This application relates to the field of computer systems and more particularly to a method and system for generating and customizing a themed graphical user interface.

BACKGROUND

Computing devices including personal computers and mobile communication devices, such as cellular phones, personal digital assistants and the like comprise an operating system having a user interface. The operating system may also provide user interface support for software applications installed on the device. Often a windowing environment is provided by the user interface such that a window occupies a delineated area of a display monitor.

The user interface of the operating system (in some instances referred to as a "shell") and/or of the applications may be themed whereby user interface elements are provided with a common look and feel. The interface elements may include borders and controls which contribute to the visual appearance of the user interface and may include icons, cursors, object borders and shadowing, menus, lists, text boxes or input boxes, push buttons, radio buttons, scrollbars, backgrounds, fonts, sounds, toolbars, etc.

In many user interfaces a desktop metaphor is applied whereby the display screen of the device visualizes a desktop having a background component over which user interface elements are displayed. In many user interfaces, the background component of the user interface may be configured to display an image or "wallpaper" behind foreground user interface elements. Users often demand flexibility and choice over the appearance of the user interface.

Although currently there exists media content development tools such as Macromedia/Adobe Flash, which allow the customization of appearances of user interfaces, they are often directed to software and content developers and are quite complex for an end-user to navigate. Further, these tools include numerous functionalities and controls that when provisioned by the developer may allow the appearance of the user interface to change depending on different events that occur. Thus the appearance of the user interface is able to change dynamically. These types of controls are overwhelming to the general user of the computing device that simply wants to change and personalize the look and feel of the user interface.

Thus it would be desirable to have a user interface customization tool and method for customizing a user interface that would allow an end user to modify certain common characteristics of the appearance of the user interface (such as fonts, colors, images, etc.) without being exposed to unnecessary functionality.

A solution to one or more of these issues is therefore desirable.

BRIEF DESCRIPTION OF THE DRAWINGS

Further features and advantages of the embodiments will become apparent from the following detailed description, taken in combination with the appended drawings, in which.

It will be noted that throughout the appended drawings, like features are identified by like reference numerals.

DETAILED DESCRIPTION OF EMBODIMENTS

Figure 1A:
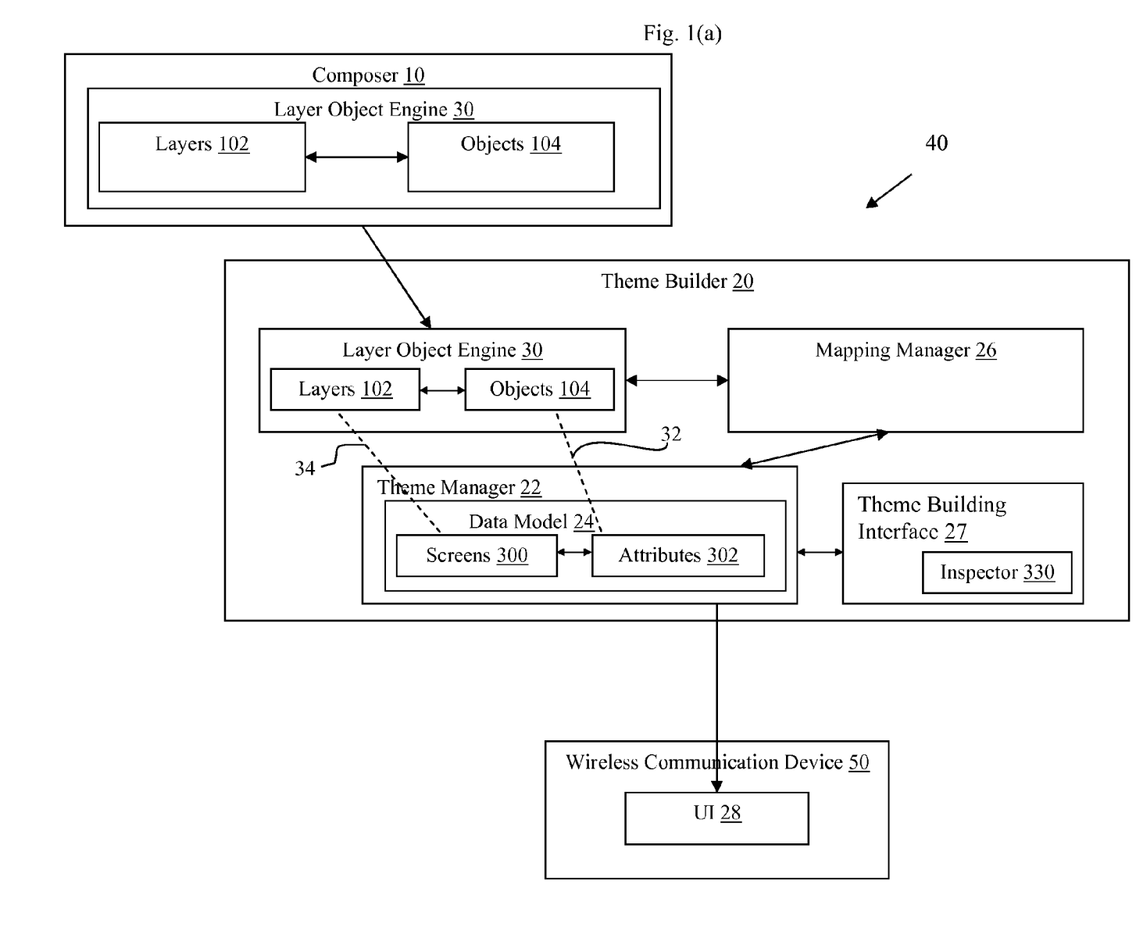
FIG. 1(a) is a block diagram of a media content development system including a theme builder module for creating custom themes for a wireless mobile device, an example computing device.

Referring to FIG. 1(a), a media content development system 40 is provided for content developers and users to develop rich media content for a wireless communication device 50. The media content development system 40 comprises a composer module 10 and a theme builder module 20.

An example of the wireless communication device 50 is the Blackberry® brand of wireless communication devices manufactured by Research in Motion Ltd. (RIM). Though the system 40 is described with reference to creating user interfaces for a wireless communication device 50 capable of voice and data communication and personal data assistant features, persons of ordinary skill in the art will appreciate that other computer systems may be substituted including personal computers such as desktops and laptops, workstations and the like. Other graphic content may also be composed.

Composer module 10 is an authoring tool comprising a collection of graphical user interfaces and command line tools that enable content developers to build, test, and simulate mobile media content such as 2D scalable vector graphics (SVG) content for viewing on the wireless communication device 50. In particular, composer module 10 is useful for creating user interfaces for target computing devices such as device 50.

Specifically, composer module 10 facilitates authoring rich media content, and particularly, SVG content. Rich media is a term used to describe a broad range of interactive digital media that exhibit dynamic motion, taking advantage of enhanced sensory features such as video, audio and animation. The Composer program for the Blackberry Mobile Data System 4.1 is an example of a commercially available composer module that can be used with the content development system 40 of this embodiment.

As described further, certain pre-determined properties and attributes of the user interface are exposed through theme builder module 20 to a user for themeing the user interface. In effect, theme builder module 20, contains a subset of the functionality of composer module 10.

For example, using composer module 10, a content developer defines certain graphical content for the wireless communication device 50. This can include interactive and animated graphics for deployment on the wireless device 50. In one example, this may include, sounds and animation that are played on the device when selecting a certain icon on a user interface 28 or it can include event-based animation such that when an event (i.e. a new mail message) arrives, an animation as defined within the Composer module 10 is triggered. Since the theme builder module is directed for quick and simple changes to fonts, colors and images, etc., for presentation on the wireless device 50, a subset of the graphical content information created by composer module 10 is used by the theme builder 20. The operation and interaction between the composer module 10 and the theme builder 20 will now be described in reference to FIGS. 1, 2 and 5.

Figure 2A:
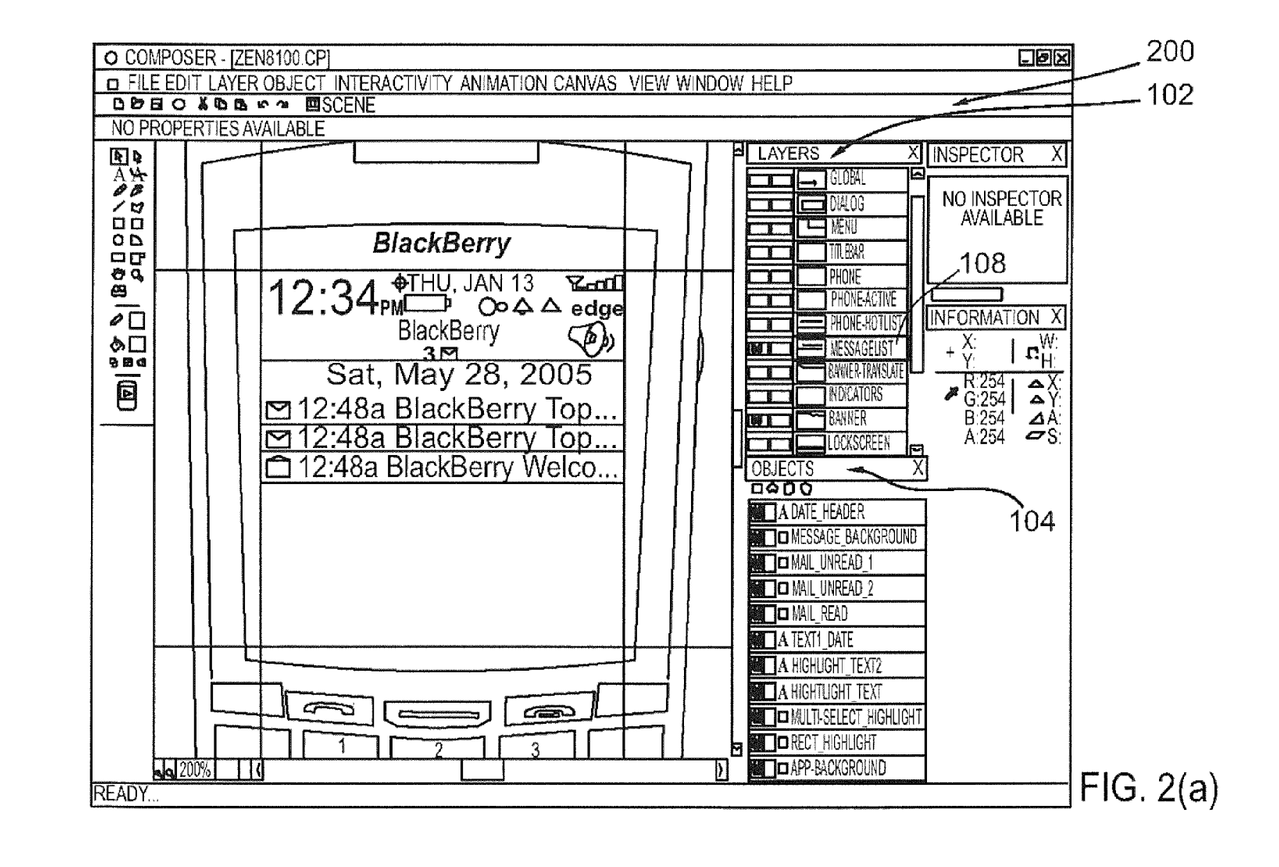
FIGS. 2(a) and 2(b) are screenshots of the composer module of FIG. 1(a)
Figure 2B:
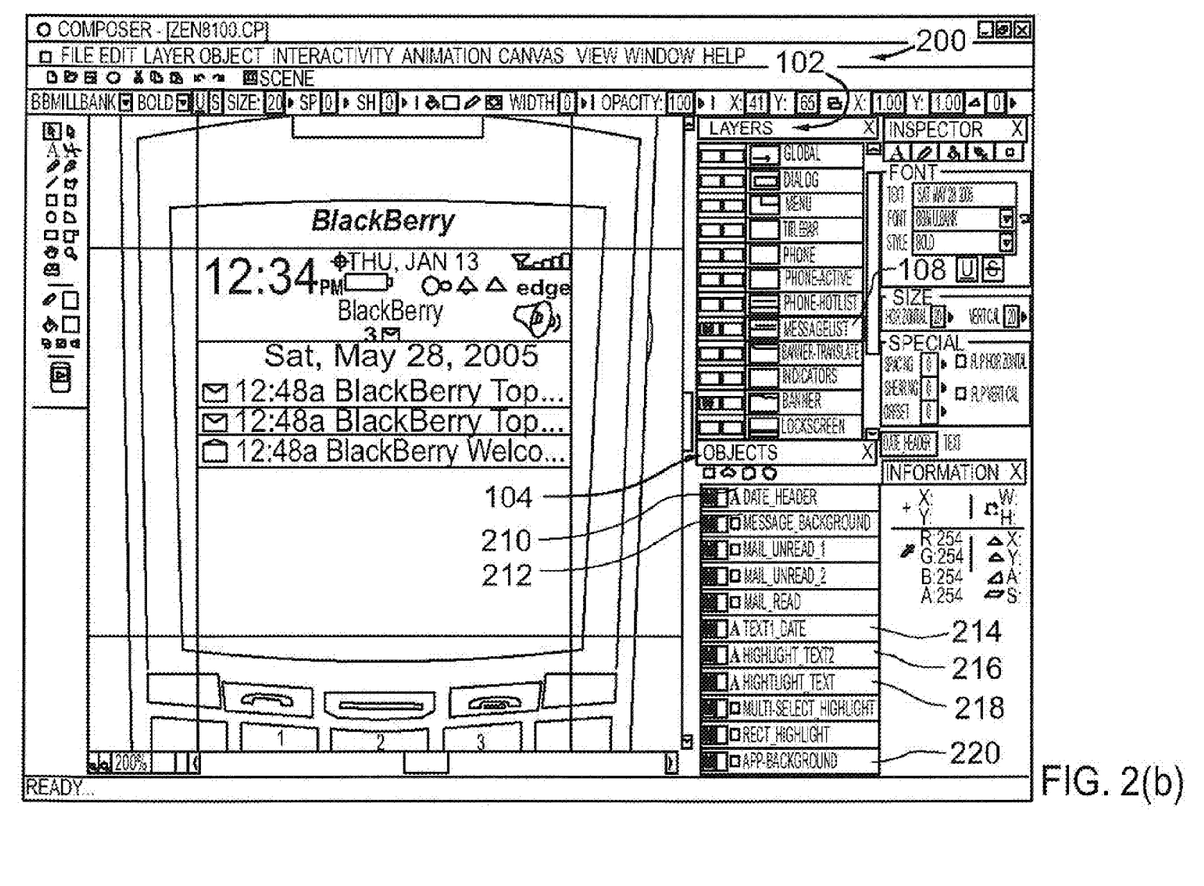

As shown in FIG. 1(a), the composer's paradigm is based on layers 102 and objects 104. A screenshot illustrating examples of layers 102 and objects 104 used within the composer module 10 is shown in FIGS. 2(a) and 2(b). A layer 102 is an entity which can be comprised of multiple objects 104. The objects 104 can include, for example, fonts, vectors, shapes, images, etc. Each layer 102 can be used to apply an effect to a group of objects 104. In turn, each object is comprised of properties, such as but not limited to, colour, font family, size bold, italic, anti-aliasing, etc.

As shown in FIG. 2(a), a composer project 200 is comprised of one or more layers 102 and each layer is associated with one or more objects 104. Using the layers 102, the objects 104 and corresponding properties, the composer module 10 is configured to create base themes (i.e. a particular user interface 28 having themeable characteristics) for the end-user to customize using the theme builder 20.

The theme builder 20 comprises a layer object engine 30 for receiving and storing layers 102 and objects 104 information as received from the composer module 10. The theme builder 20 further comprises a theme manager 22 and a mapping manager 26. The theme manager 22 further comprises a data model 24, which includes screens 300 and attributes 302. One or more inspectors 330 are defined within a theme building interface 27 for communicating with the data model 24 and customizing the screens 300 and attributes 302. As will be further described, the one or more inspectors 330 allow the end-user to select different screens 300 and modify their corresponding screen attributes 302.

Figure 3:
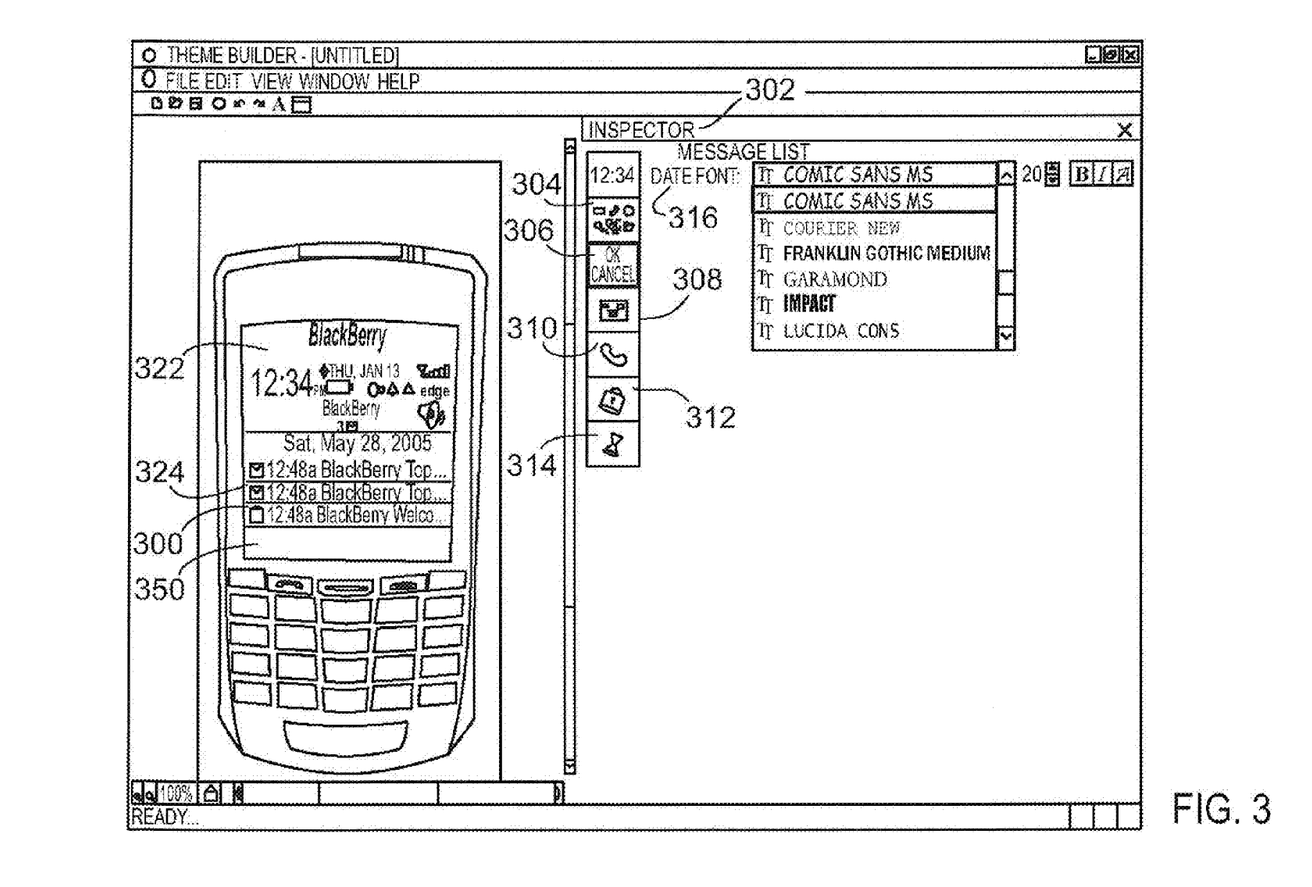
FIGS. 3 and 4 are screenshots of the theme builder module of FIG. 1(a) during creation of a theme for the wireless device.
Figure 4:
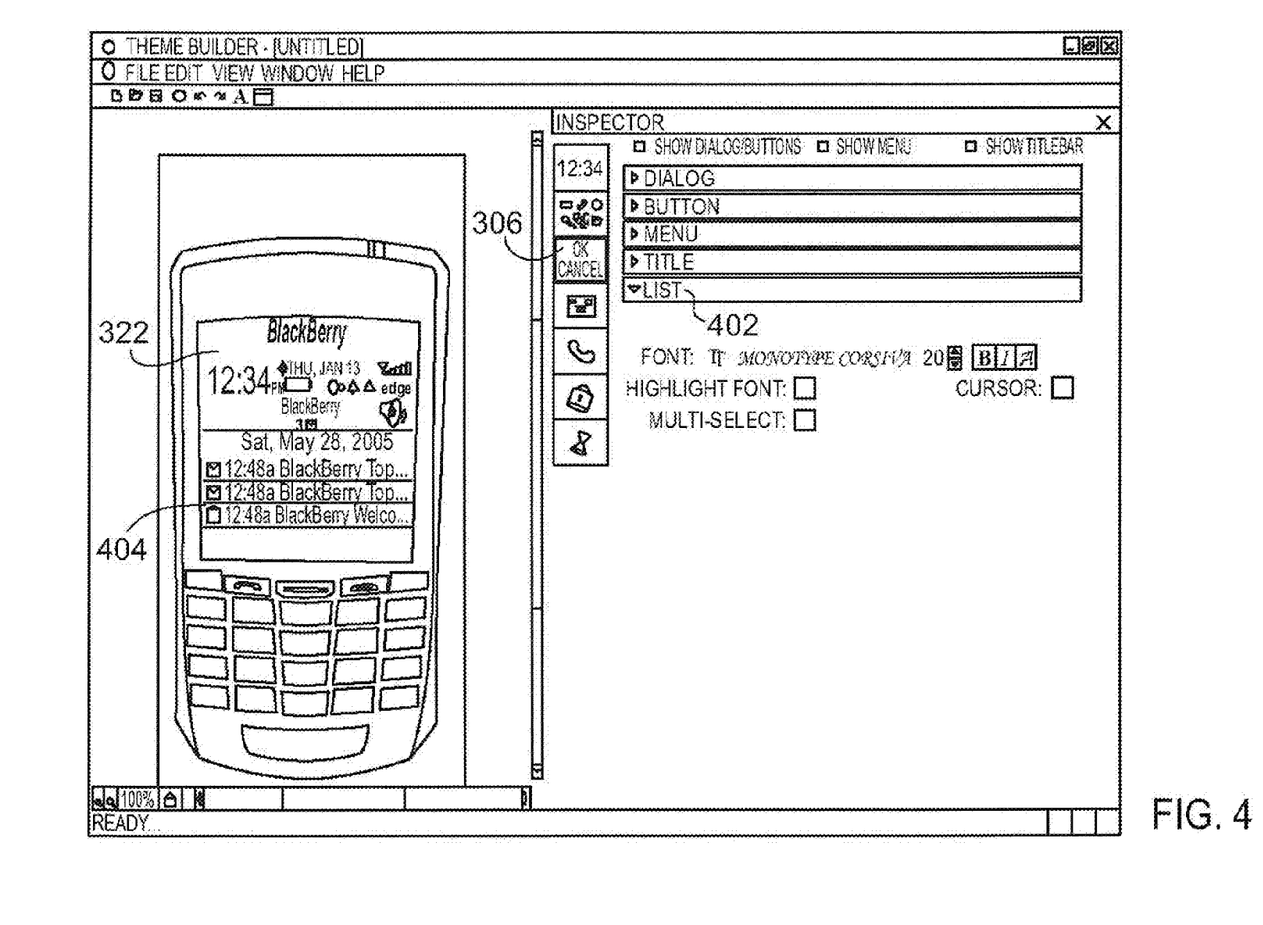

Thus, as illustrated in FIG. 3, each theme comprises one or more screens 300 and corresponding attributes 316. The screens for a wireless mobile device 50 can include, for example, a banner screen 322, a message screen 324, a home screen, an active call screen, the call log screen, the idle screen, etc. Within each of the screens 300, there are one or more attributes 316 that can be customized or themed. The attributes that can be customized can include for example, the icons on the homescreen, the font for the status text on the bottom, the background image on the homescreen.

Referring again to FIG. 3, it is shown that in one example, the attributes 316 that may be customized within the message screen 324 include the date font (i.e. the font family, size, type) and background graphics.

Referring again to FIG. 1(a), the layers 102, and objects 104 information which define the base theme to be customized, are assigned unique names by the composer module 10.

This base theme information which is saved within the composer module 10 is loaded into the theme builder module 20 which stores it in the layer object engine 30.

With the base theme information loaded into the layer object engine 30, the mapping manager 26 then maps the screens 300 and screen attributes 302 defined in the data model 24 to the corresponding layers 102 and objects 104 which are identified by their unique names. One or more of the objects 104 within those layers 102 match the entities in the screen 300 that could be themed. In addition, at least some of the objects 104 have one or more graphical properties. Thus, screen attributes 302 are mapped to the specific corresponding graphical properties of the objects (i.e. font size, font family, style, etc).

Figure 1B:
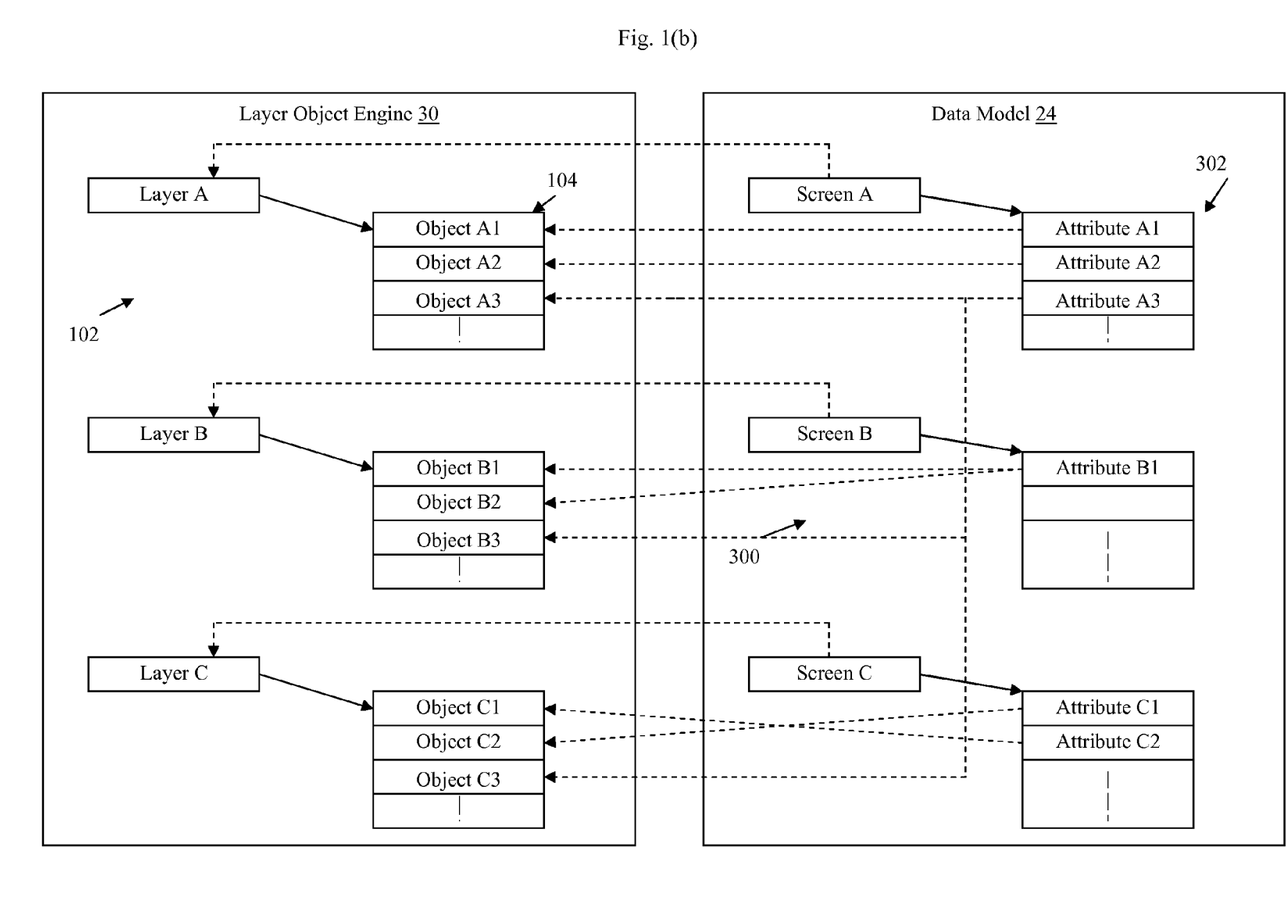
FIG. 1(b) is a block diagram showing the association between the layer object engine and the data model of the theme builder module of FIG. 1(a) in accordance with an embodiment.

Referring now to FIG. 1(b), an example mapping between screens 300 to layers 102 as well as attributes 302 to objects 104 as defined by the mapping manager 26 is shown. As can be seen, each screen 300 is mapped to one layer 102. In turn, each screen attribute 302 is mapped to one or more objects 104 (and their corresponding graphical properties), such that the mapped objects 104 are related to the mapped layer 102. By mapping an attribute 302 to one or more objects 104, it allows the modification of one or more graphical properties of several objects 104 simultaneously. In addition, this reduces the complexity of making changes to the screen's graphical content for the end user.

As will be described later, according to one embodiment, there are global screen attributes 302 which map to objects 104 relating to different layers 102 such that modification of the global screen attributes 302 affects the various layers 102.

The following example shows a piece of pseudocode illustrating how screen attributes 302 and screens 300 are defined and used within the data model 24. The pseudocode further illustrates how the link is formed between the one or more screens 300 to corresponding layers 102 and screen attributes 302 to corresponding objects 104.

```
// Provide mapping between a screen and a corresponding predefined layer
layer = layerobjectengine→ GetLayer<"Layer_name">
screen→SetLayer(layer);
Attribute A;
object=layerobjectengine→GetObject<"Object_name1"..."Object_nameN"
//Add one or more dependent objects to the screen attribute
//i.e. perform mapping between the screen attribute and the objects
A→AddDependant<object>;
screen→ AddAttribute(A);
```

An example of the mapping for the user interface can be seen in FIGS. 2(a), 2(b), 3 and 4. For example, in FIG. 3, the date font attribute 316 relating to the messages screen 324 maps to the date_header object 210 of the messagelist layer 108 (which is mapped to the messages screen 324). Thus by changing the font size or font family of the date font attribute 316, the object property (i.e. the font) of the data_header 210 object is also changed.

In another example, the list text attribute 402 of the list screen 404 (shown in FIG. 4) is mapped to the highlight_text 218, highlight_text2 216, and text1_date 214 objects. Similar to the mapping described above, the message screen 324 is mapped to the messagelist layer 108.

According to an embodiment of the invention, there exists global screen attributes 302 within the data model 24 which are linked to objects 104 associated with more than one layer. An example of such mapping is shown in FIG. 1(b). In this case, global screen attribute A3 which is defined within screen A is then linked to object A3 belonging to layer A, object B3 belonging to layer B and object C3 belonging to layer C. It will be understood by a person skilled in the art, that the global screen attribute 302 may be mapped to more than one object 104 belonging to the same layer 102 as well as being mapped to other objects 104 belonging to other different layers 102. Advantageously a global screen attribute 302 allows the user to modify a single screen attribute 302 (through the one or more inspectors 330) and this change is reflected in the corresponding objects associated with the different layers 102.

Figure 6:
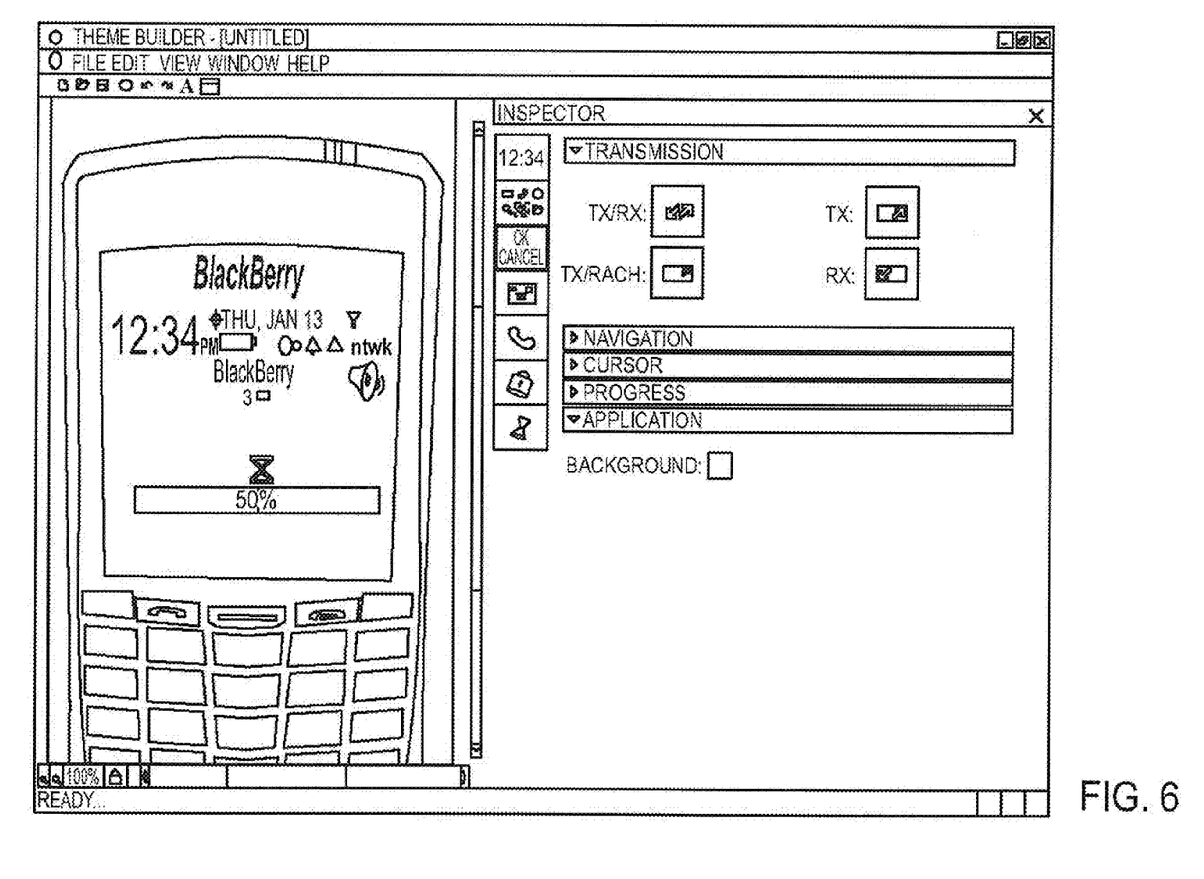
FIG. 6 is a screen shot of the theme builder module of FIG. 1(a) during modification of a global attribute for a screen of the wireless device.

FIG. 6 illustrates a screen shot of the theme builder 20 module during modification of a global screen attribute 602. In this case, the global screen attribute 602 is a background screen attribute 302 which affects the background objects 104 that are associated with a number of different layers 102. As discussed earlier, the global screen attribute 602 is mapped to the corresponding objects 104 and their relevant graphical properties (i.e. background colour, background pattern types, background images). Thus, in one example, by modifying this global screen attribute 602, the change is reflected on the objects 104 corresponding to different layers 102. For example, the global screen attribute 602 may affect the "date background" object 104 which is existent in various different layers 102.

It should be noted that as the different screens 300 are layered relative to one another, one or more of the screens 300 can make up a composite screen 350 (shown in FIG. 3). For example, in FIG. 3 the banner screen 322 and the message screen 324 make up a composite message screen 350 which is displayed on the wireless communication device 50 when a request to view messages is received. Further, the one or more inspectors 330, allows the navigation between different screens 300. As shown in FIG. 3, the inspectors 330, may for example include, a banner inspector 302, a home screen inspector 304, a controls inspector 306, a phone inspector 310, a lock inspector 312 and an idle screen inspector 314. By selecting each of the relevant inspectors 330, the user can customize different components of the user interface 28.

For example, by selecting the banner inspector 302, the user can modify the color scheme and background image that is used in the banner screen 322 that appears across the top of the interface shown in FIG. 3.

Referring again to FIGS. 3 and 4, the interface for theme builder 20 consists of a tabbed list of screens 300. As discussed earlier, by selecting the desired inspector 330 icon, the attributes within the screen can be modified. Clicking on an inspector for a screen 300 turns the screen on for display and may turn off the previously displayed screen 300. This is in effect setting the visibility for the layer 102 in the layer object engine 30 to be on/off. Consider for example, that the message list screen 324 is currently selected as the active screen 300 and the user wants to switch to the homescreen (by selecting the home screen inspector 304). In this manner, the theme building interface 27 notifies the data model 24 that the screens 300 has been changed thus the corresponding layer 102 in the layer object engine should be turned on/off. In this case, the message list layer's 108 visibility is turned off and the homescreen layer's visibility is turned on.

Figure 5:
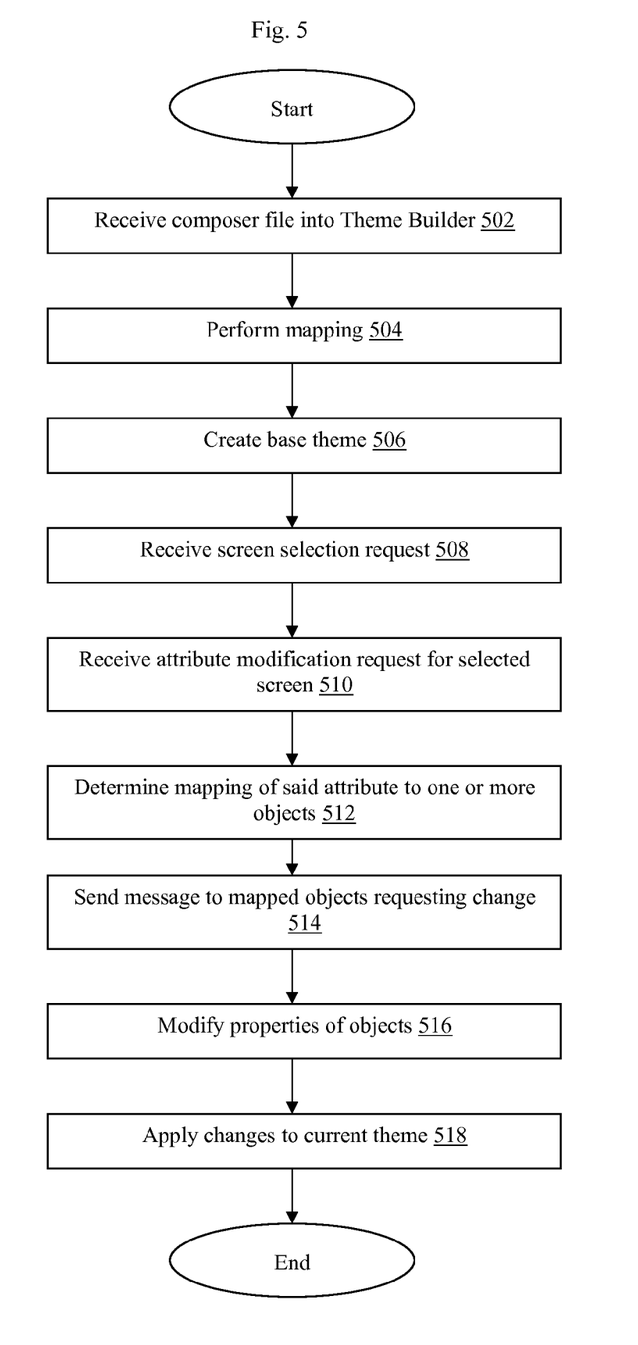
FIG. 5 is a flowchart of operations for modifying the theme of the wireless device.

Referring now to FIG. 5, shown is an exemplary operation of the system 40. At step 502, the composer 10 file is loaded into the layer object engine 30 of theme builder 20. As discussed earlier, the composer 10 file and its corresponding layers 102 and objects 104 have been previously defined using the composer 10 module. As described earlier, these layers 102 and objects 104 which are loaded into the layer object engine 30 of theme builder 20 are used to define the base theme that is customizable by the theme builder 20 through the theme building interface 27.

At step 504, the mapping manager 26 performs the mapping between the screens 300 to layers 102 (screen-to-layer mapping 34 shown in FIG. 1(a)) and attributes 302 to objects 104 (attribute-to-object mapping 32 shown in FIG. 1(a)) within the data model 24. At step 506, a base theme is created based on the mapping and extra theming information [Note: can please define what you are referring to as extra theming information]. It should be noted that the theme manager 22 may also be configured to facilitate a user to choose a particular stored theme as the current theme. The theme manager 22 may then receive a screen 300 selection request through the one or more inspectors 330. Further, in accordance with the present embodiment, the theme manager 22 receives an attribute 302 modification request (through the theme building interface 27) for the selected screen at step 510. Using the mapping manager 26, the theme manager 22 determines the mapping of attribute 302 to one or more objects 512 as defined earlier. The theme manager 22 sends a message at step 514 to the mapped objects 104 (corresponding to attribute 302) requesting change of the objects 104 properties. As discussed earlier, this can include for example, the colour, font, background of an object 104. At step 516, the properties of the mapped objects 104 are modified accordingly. At step 518, the changes are applied to the current theme and can be deployed onto the wireless communication device 50.

It will be understood by a person skilled in the art that changes to the screen attributes 302 as a result of user input through the theme building interface 27 may be communicated to the layer object engine 30 substantially simultaneously. Alternatively, the changes made within the inspectors 330 is communicated to the theme manager 22 which passes messages containing information about several screen attributes 302 to the layer object engine 30 and modifications are then reflected in the corresponding objects 104. In this case, user input to confirm (e.g. "Apply") the changes may trigger the update.

Although the disclosure herein has been drawn to one or more exemplary systems and methods, many variations will be apparent to those knowledgeable in the field, and such variations are within the scope of the application.

What is claimed is:

1. A method of customizing a customizable theme of a user interface of a wireless mobile device, the method comprising:
  receiving a base theme comprising a plurality of layers, each of the layers comprising at least one graphical object, the graphical object having one or more graphical properties;
  mapping each one of a plurality of screens of the user interface to a respective one of the plurality of layers, each of the mapped screens having at least one screen attribute associated therewith;
  mapping each respective at least one screen attribute to the graphical properties of the at least one graphical object of the respective one of the layers, the mapped screens and the least one screen attribute defining the customizable theme of the user interface;
  customizing the customizable theme in response to a modification to a respective at least one screen attribute, the modification modifying respective graphical properties of at least one graphical object of the base theme in accordance with the mappings.

2. The method of claim 1, further comprising:
  presenting a theme building interface for selecting the plurality of screens.

3. The method of claim 2, wherein customizing the customizable theme further comprises:
receiving a screen attribute modification request for modifying the at least one screen attribute corresponding to a first screen of the plurality of screens;
receiving a selection of the first screen; and
displaying the first screen on the theme building interface.

4. The method of claim 3 further comprising:
selecting a second screen for display on the theme building interface;
receiving a screen change request to customize the theme for the second screen;
determining the mapped layer corresponding to the second screen;
setting a visibility selection on for the mapped layer corresponding to the second screen; and
setting a visibility selection off for the mapped layer corresponding to the first screen.

5. The method of claim 1 wherein at least one of the layers comprises a plurality of graphical objects, and the step of mapping further comprises mapping the graphical properties of the plurality of graphical objects to a respective one of the at least one screen attribute.

6. The method of claim 1, wherein the at least one screen attribute comprises a global screen attribute.

7. The method of claim 6 further comprising:
mapping the global screen attribute to the graphical properties associated with at least two of the layers;
receiving a user input to modify the global screen attribute; and
modifying the graphical properties for the at least two of the layers, the modification being reflected in at least two screens corresponding to the respective at least two of the layers.

8. A computing device comprising a non-transitory memory having instructions stored thereon to configure a processor for customizing a customizable theme of a user interface of a wireless mobile device, the instructions configuring the processor to provide via the computing device:
a theme builder module comprising:
a layer object engine for receiving a base theme, the base theme comprising a plurality of layers, each of the layers associated with at least one graphical object, the at least one graphical object having one or more graphical properties;
a theme manager for storing a plurality of screens defining the customizable theme, each of the screens having at least one screen attribute associated therewith; and
a mapping manager for mapping each of the screens to a respective layer of the plurality of layers of the user interface, the mapping manager further mapping each screen attribute to the corresponding graphical properties related to the screen attribute; and
wherein the theme manager is configured to receive a request to modify the at least one screen attribute to customize the customizable theme based on the mapped corresponding graphical properties of the base theme related to the at least one screen attribute.

9. The device of claim 8, wherein the theme manager is further configured for defining a global screen attribute.

10. The device of claim 9, wherein the mapping manager is further configured for mapping the global screen attribute to the graphical properties respectively associated with at least two of the layers.

11. The device of claim 8 wherein the instructions configure the processor to further provide:
a theme building interface comprising:
a plurality of inspectors each corresponding to a respective one of the plurality of screens, the inspectors configured for receiving user input relating to the first screen and the attribute modification request, the plurality of inspectors further configured for facilitating the display of the screens and communicating the user input to the theme manager.

12. The device of claim 8 wherein the mapping manager is configured to determine, in response to the screen attribute modification request, the mapped layer for the first screen and determine the graphical properties of the at least one graphical object corresponding to the modified screen attribute.

13. A computer program product comprising a non-transitory storage device having computer readable code stored therein for execution by a processor for configuring a theme developing computer to customize a customizable theme of a user interface of a wireless mobile device, the computer readable code comprising instructions and data for configuring a processor of the theme developing computer to;
receive a base theme comprising a plurality of layers, each of the layers comprising at least one graphical object, the at least one graphical object having one or more graphical properties;
map each of a plurality of screens of the user interface to a respective one of the plurality of layers, each of the plurality of screens having at least one screen attribute associated therewith;
map each respective screen attribute to the graphical properties related to the respective screen attribute, the mapped screens and the at least one screen attribute defining the customizable theme of the user interface; and
customize the customizable theme in response to a modification to a respective at least one screen attribute, the modification by modifying respective graphical properties of at least one graphical object of the base theme in accordance with the mappings.

14. The computer program product of claim 13 wherein the instructions and data configure the execution of the processor to:
present a theme building interface for selecting the screens and modify the at least one screen attribute.

15. The computer program product of claim 14 wherein the instructions and data configure the execution of the processor to:
receive a selection of the first screen; and
display the first screen on the theme building interface.

16. The computer program product of claim 15 wherein the instructions and data configure the execution of the processor to:
select a second screen for display on the theme building interface;
receive a screen change request to customize the theme for the second screen;
determine the mapped layer corresponding to the second screen;
set a visibility on for the mapped layer corresponding to the second screen; and
set a visibility off for the mapped layer corresponding to the first screen.

17. The computer program product of claim 13, wherein at least one of the plurality of layers comprises a plurality of graphical objects and wherein the instructions and data configure the execution of the processor to:

map the graphical properties belonging to the plurality of graphical objects to a respective one of the at least one screen attribute.

18. The computer program product of claim 13, wherein the user interface further comprises a global screen attribute.

19. The computer program product of claim 18, wherein the instructions and data further configure the execution of the processor to:

map the global screen attribute to the graphical properties associated with at least two of the layers;

receive the user input to modify the global screen attribute; and modify the graphical properties for the at least two of the layers, the modification being reflected in more than one screen respectively corresponding to the at least two of the layers.

* * * * *